Patented June 5, 1951

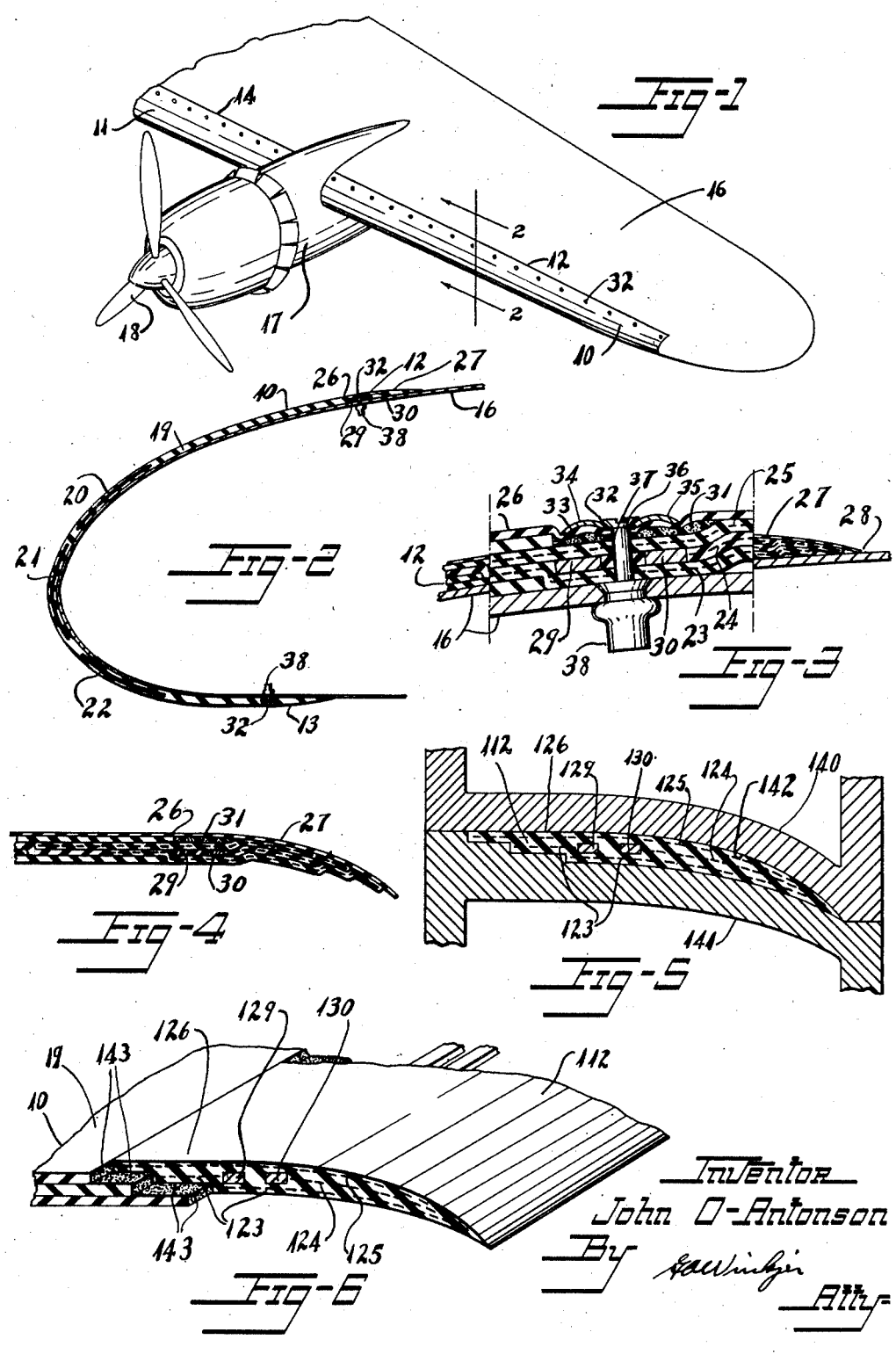

2,555,625

UNITED STATES PATENT OFFICE 2,555,625

PROTECTIVE COVERING FOR THE LEADING EDGES OF AIRFOILS

John O. Antonson, Akron, Ohio, assignor to The B. F. Goodrich Company, New York, N. Y., a corporation of New York Application April 26, 1946, Serial No. 665,218

8 Claims. (Cl. 244—134)

1

The invention relates to protective coverings for the leading edges of airfoils and other structures and especially to the attachment of the coverings to the leading edges in a tensioned condition between opposite margins while maintaining smooth flow of air across the margins.

Objects of the invention are to provide for attaching a protective covering in a condition of tension between opposite margins thereof while maintaining substantially uniform continuity of said condition of tension along the margins; to provide for securely attaching the covering at said margins to an airfoil and other structure; to provide for avoiding localized zones of turbulent flow of air across the margins; to provide for avoiding "scalloping" action under the condition of tension between the margins at regions along the latter between spaced-apart fastener means; to provide for dual reinforcing means effecting a truss action at each attaching margin; to provide for a preformed elastic fairing construction at and integrally united with the attaching margins of the covering; to provide for simplicity of construction and convenience of manufacture and installation; and to provide for effectiveness of operation.

These and other objects and advantages will be apparent from the following description.

In the drawings, which form a part of the specification and in which like numerals are employed to designate like parts throughout, Fig. 1 is a perspective view of protective coverings having attaching margins mounted on the leading edge of an aircraft wing and constructed in accordance with and embodying the invention, parts being broken away, Fig. 2 is a sectional view taken along line 2—2 of Fig. 1, parts being broken away, Fig. 3 is a sectional view of an attaching margin including an elastic fairing strip integral with the covering, parts being broken away and parts being shown on an enlarged scale, Fig. 4 is a sectional view of the covering having the attaching margin and fairing strip of Fig. 3 as built and cured, parts being broken away, Fig. 5 is a sectional view of a modification of the elastic fairing strip and a mold for forming the same, parts being broken away, and Fig. 6 is a sectional perspective view from above of the pre-molded fairing strip of Fig. 5 in assembled relation with the attaching margin of the covering, parts being broken away.

In the illustrative embodiment of the invention shown in the drawings, inflatable protective coverings 10, 11 are mounted in a condition of tension or stretch between opposite upper and lower attaching margins 12, 13 and 14 at the leading edge of an airfoil or wing 16 of an aircraft and are positioned at the inboard and outboard sides, respectively, of an engine nacelle 17 and propeller 18.

The construction of the covering 10 includes a body 19 of resilient rubber or other rubber-like material having embedded therein inflatable tubes 20, 21, 22 extending spanwise of the covering at a central zone of the latter intermediate the opposite attaching margins 12, 13 for distending and stretching the outer face of the covering in a manner to effect removal of ice deposited on the covering at the central zone and at regions rearwardly of the latter. All attaching margins 12, 13 of the covering may be of similar construction; consequently only the construction of the upper margin 12 will be described in detail.

The upper attaching margin 12 includes suitable resilient rubber-like material integrally united with and in continuation of the rubber-like material of the body 19 and may have reinforcements 23, 24, 25 of flexible sheet material embedded therein in superimposed relation to one another, which reinforcements may be of square-woven fabric of cotton, nylon, rayon or other suitable filamentary material, as shown especially in Figs. 3 and 4. The margin 12 has a forward portion 26 and a rearward or fairing portion 27 tapering in cross-section to an edge at 28, and by virtue of its construction and arrangement in continuation of and integrally with the body 19 of the covering facilitates smooth flow of air across the margin and in addition advantageously avoids the necessity of independent fairing strips of metal heretofore attached to the margins of prior constructions of inflatable protective coverings.

Reinforcing bead elements 29, 30 of stiff material such, for example, as relatively flat wire of steel or other suitable metal are embedded in the rubber-like material of the margin at the forward portion 26 for effecting a truss-like bracing action along the margin, and are positioned desirably beneath the outer surface of the margin intermediate the inner and outer fabric reinforcements 23 and 25. The bead elements 29, 30 are spaced-apart laterally of the margin in the chordwise direction of the covering in close proximity to one another and extend in substantially parallel relation to one another spanwise of the covering substantially coextensive with the length of the covering at the margin 12. In such arrangement the inner bead element 29, by virtue of its stiffness, assures the transmission of the stresses, under the condition of stretch of the covering, substantially uniformly along the margin 12 through the rubber-like material of the margin to the outer bead element 30 despite the spanwise spaced-apart local regions of attachment at the margin 12 to the wing. The inner bead element 29 coacts with the outer bead element 30 and the rubber-like material adjacent and between said elements 29, 30 in providing a truss-like bracing action for sustaining the stresses of stretch and in maintaining the desired straight-line configuration of the margin.

The arrangement of dual spaced-apart bead elements and intervening rubber-like material in mutual coacting relation facilitates the provision of highly desirable substantially uniform continuity of a condition of stretch of the covering between and along the opposite attaching margins 12, 13 by virtue of the truss-like bracing action of said arrangement. This feature results in effectively overcoming an objectionable "scalloping" action of the margins under the stretched condition of the covering as has been the case in prior margin constructions employing a single bead wire subject to localized stresses in zones intermediate spaced-apart fastening means, which localized stresses sometimes have caused flexure of the single bead wire in a scalloped manner.

The margin 12 may include a sheet-like element 31 of soft, resiliently deformable material such, for example, as sponge rubber-like material disposed beneath the outer surface of the margin in superimposed relation to the outer fabric reinforcement 25 and the laterally spaced-apart bead wires 29, 30 as shown especially in Fig. 3, for facilitating by virtue of the compression of the sponge rubber-like material a countersunk disposition of spanwise spaced-apart fastener means 32 for securing the covering 10 to the wing 16. This is advantageous in avoiding localized zones of objectionable turbulent flow of air at the fastener means due to protruding fastener elements at the outer surface of the covering and promoting smooth laminar flow of air across the margin. The fastener means, in the illustrated construction, includes a washer 33 of suitable stiff material of suitable form having substantially arcuate in cross-section wing portions 34, 35 defining an aperture 36 for receiving a screw fastener 37 having a countersunk head. The washer is adapted to clamp and to press both bead elements 29 and 30 toward the structure of the wing. The screw fastener 37 extends between the bead elements 29, 30 and may detachably engage an interiorly threaded hollow rivet 38 secured to the wing. Such arrangement and the spanwise spaced-apart disposition of the fastener means 32 at a plurality of positions along the attaching margin effectively prevents objectionable tipping or bending of either flat bead element 29 or 30 under stresses in the covering for the mounted condition thereof on the wing.

The fabric and rubber parts of the covering 10 including the attaching margins 12, 13 may be built integrally as a unit and are united preferably by vulcanization.

The inflatable protective covering 10 including the attaching margins 12, 13 is attached to the wing 16 and is installed in a condition of stretch between the margins 12, 13. Such attachment of the covering in a secure manner is accomplished by a spanwise spaced-apart disposition of the screw fastener 37 and washer 33 arrangements in series along the respective margins so that the screw fasteners extend through apertures in the rubber-like material of the margins and between the chordwise spaced-apart reinforcing bead elements 29, 30 into threaded engagement with the hollow rivets 38, 38. The washers 33, 33 are pressed into the resilient rubber-like and sponge rubber-like materials overlying the reinforcing bead elements to a position substantially flush with the outer surface of the margins 12, 13 thereby avoiding localized protuberances at the margins and facilitating smooth flow of air thereover. The washers 33, 33 also press toward the reinforcing bead elements and the wing for maintaining and effectively holding the reinforcing bead elements in the desired lateral spacing and against the wing, and also exerting a clamping action such that objectionable tilting of the reinforcing bead elements, especially the outer bead elements 30, 30, is prevented.

The securely held condition of the reinforcing bead elements 29, 30 effected by the fastener means 32, 32 in combination with the stiffness of the inner bead element 29 at each margin assures substantially uniform continuity along the margin of transmission of stretching stresses through the intervening rubber-like material of the margin to the outer bead element 30 providing by the coaction of the bead elements and adjacent and intervening rubber-like material a truss-like bracing action along the margin. In this manner, the arrangement avoids substantial distortion and flexure of the outer bead element 30 at regions intermediate the respective screw fastener and washer assemblies despite the pulling action toward the screw fasteners exerted by the stretching stresses on the outer bead element. Thus, the reinforcing bead elements, the fastener means and the other parts of the margin construction cooperate in preventing effectively the objectionable "scalloping" configuration of the margin even though the stretching stresses be increased under inflation of the tubes 20, 21, 22 causing distention of the covering and further stretching of the rearward portions of the covering. For the mounted condition of the covering, the tapered and curved rearward portions 27, 27 of the margins 12, 13 are resiliently flexed into contact with the wing so that the trailing edges 28, 28 effect sealing with the wing by lip-action.

The hereinabove described construction and arrangement of the covering 10 and margins 12, 13 facilitates especially the convenient installation of the covering in a securely attached manner avoiding "scalloping" of the margins and promoting smooth flow of air across the margins.

If desired, each attaching margin, for example a margin 112 corresponding to the margin 12, may be preformed and assembled as an independently cured unit for subsequent assembly with an already built and cured covering. The assembly may be effected subsequent to vulcanization of the covering, as shown especially in Figs. 5 and 6, or even during installation of the covering on the wing. The margin 112 at the forward portion 126 may have a stepped construction arranged for mating engagement with the body 19 of the covering 10 having a corresponding stepped construction at the region of the margin 112. The margin 112 is constructed and arranged otherwise substantially like the margin 12 and includes fabric reinforcements 123, 124, 125 and spaced-apart bead elements 129, 130. The margin 112 may be molded and vulcanized under heat and pressure in the desired form by means of suitable apparatus including upper and lower mold platens 140 and 141, respectively, defining a cavity 142 providing the desired stepped, tapered in cross-section, and curved configuration of the margin 112 for the preformed and cured condition of the latter. The margin 112 in the cured condition may be attached to and integrally united with the body 19 of the covering as by a suitable air-curing rubber cement 143 or by localized heat-vulcanization, as shown especially in Fig. 6.

Variations may be made without departing from the scope of the invention as it is defined in the following claims.

I claim:

1. An inflatable protective covering for the leading edge of an airfoil attachable in a condition of chordwise stretch by fastenings at spaced-apart positions along the covering in each of separated marginal zones extending spanwise of the covering, said covering comprising a body of resilient rubber-like material having a marginal portion of said material at each said zone, inflatable means for distending the covering, and a pair of reinforcing elements of relatively stiff strip material embedded in said rubber-like material of each said portion and extending in side-by-side and chordwise spaced-apart relation to one another in said covering along said positions at said portion to provide in conjunction with the adjacent material of said portion a composite structure having a truss-like action for resisting scalloping of the marginal portion between said positions under the inflating stresses of the covering against the fastenings.

2. An inflatable protective covering for the leading edge of an airfoil attachable in a condition of chordwise stretch by fastenings at spaced-apart positions along the covering in a marginal zone extending spanwise of the latter, said covering comprising a body of resilient rubber-like material having an attaching portion at said zone and inflatable means for distending the covering, a rearward portion of rubber-like material extending from said attaching portion and tapered in cross-section to an edge for sealing against the airfoil by lip-action, flexible reinforcing material in said attaching portion and said rearward portion, a pair of reinforcing bead elements of relatively stiff material embedded in said rubber-like material of said rearward portion and extending in side-by-side chordwise spaced-apart relation to one another along said positions and disposed at opposite sides of said positions so that the fastenings are attachable between said reinforcing elements, said reinforcing bead elements providing in conjunction with the adjacent rubber-like material a truss-like action for resisting scalloping between said positions under the inflating stresses of the covering against the fastenings, and an element of relatively soft rubber-like material overlying said reinforcing elements so that the fastenings tend to compress the soft material providing conforming depressions in the outer surface of the covering for receiving the fastenings in the depressions to maintain the continuity of contour of the covering substantially smooth at said positions.

3. A fairing strip for independent assembly in continuation of and bonded union with a protective covering of flexible material at a margin of the covering which covering is subject to mounting upon a structure in a condition of tension in the direction laterally of said margin, said strip comprising an elongated body of resilient rubber-like material having a portion of the rubber-like material extending along the strip for disposition adjacent said covering at said margin and presenting a surface for mating contact with a corresponding surface of said covering at said margin and for bonded union with said material of the covering, and said body tapering in cross-section to a sharp edge and having a concave under surface for effecting sealing at said edge against said structure by lip-action of the edge, flexible reinforcing material in said portion of said body, a reinforcing bead element of relatively stiff strip material extending in said portion adjacent said front surface, and a second reinforcing bead element of relatively stiff strip material extending in said portion in spaced-apart relation to the first said reinforcing bead element with said rubber-like material united with and interconnecting the bead elements to provide therewith a truss-like action for resisting lateral distortion of the fairing strip under the stresses of lateral tension transmitted to the fairing strip by said covering.

4. A fairing strip for independent assembly in continuation of and attachment to a protective covering of flexible material at a margin of the covering which covering is subject to mounting upon a structure in a condition of tension in the direction laterally of said margin, said strip comprising an elongated body of resilient rubber-like material having a portion of the rubber-like material extending along the strip for disposition in contact with and attachment to said covering at said margin, and said body tapering in cross-section to a thin edge and having a concave under surface for effecting sealing at said edge against said structure by lip-action of the edge, a reinforcing bead element of relatively stiff strip material extending in said portion, and a second reinforcing bead element of relatively stiff strip material extending in said portion in spaced-apart relation to the first said reinforcing bead element with said rubber-like material united with and interconnecting the bead elements to provide therewith a truss-like action for resisting lateral distortion of the fairing strip under the stresses of lateral tension transmitted to the fairing strip by said covering.

5. A protective sheet-like covering for attachment to a surface by means of fastenings at a series of attaching positions spaced-apart along the covering with the covering held in a condition of stretch laterally away from said series of positions, said covering comprising a sheet-like body of flexible rubber-like material subject to the stretch and extending to and including said series of positions, a strip of relatively stiff material in said covering along said series of positions, a second strip of relatively stiff material in said covering along said series of positions in spaced-apart relation to the first said strip, the spaced-apart strips being secured to said rubber-like material and providing therewith a composite structure having a truss-like action for resisting scalloping of the sheet-like covering between the attaching positions of said series under the stretching stress on said covering laterally of said series of positions.

6. A protective sheet-like covering as defined in claim 5 in which the spaced-apart strips are disposed at opposite sides of said series of attaching positions so that the fastenings are attachable between said strips.

7. A protective sheet-like covering as defined in claim 5, in which the spaced-apart strips are embedded in said rubber-like material between the inner and outer surfaces of the covering, and said composite structure of the covering comprises fabric reinforcing material disposed between said inner and outer surfaces and united with said rubber-like material, said reinforcing material overlying and underlying and bridging said strips and coacting with said strips and said rubber-like material to augment the truss-like action.

8. A protective sheet-like covering as defined in claim 5, in which the spaced-apart strips are disposed at opposite sides of said series of attaching positions so that the fastenings are attachable between said strips, and said composite structure of the covering includes relatively soft rubber-like material overlying said strips and a bridging element across said strips and overlying the soft material for compression against and yielding into the soft material by the fastenings to press both strips and resist their individual and collective tilting under the stretching stress on the sheet-like covering.

JOHN O. ANTONSON.

REFERENCES CITED

The following references are of record in the file of this patent:

UNITED STATES PATENTS

| Number | Name | Date |
| --- | --- | --- |
| 1,226,600 | Schemmel | May 15, 1917 |
| 1,721,856 | Carleton | July 23, 1929 |
| 2,204,122 | Colley | June 11, 1940 |
| 2,237,175 | Colley | Apr. 1, 1941 |